March 1, 1960 — T. F. HAGGAI ET AL — 2,927,268
TACHOMETER
Filed Nov. 1, 1957
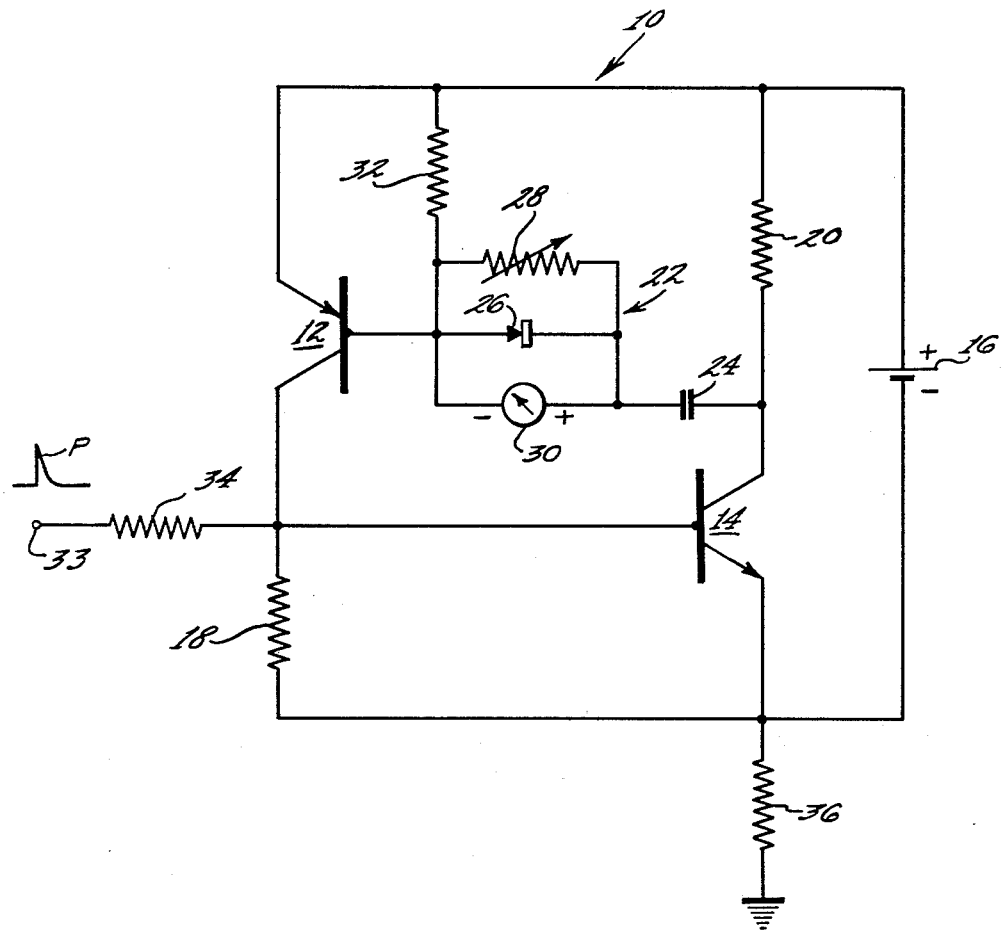
INVENTORS.
Theodore F. Haggai &
Frederick F. Shoup
BY
ATTORNEY.

United States Patent Office 2,927,268
Patented Mar. 1, 1960

2,927,268

TACHOMETER

Theodore F. Haggai and Frederic F. Shoup, Princeton, N.J., assignors to Radio Corporation of America, a corporation of Delaware Application November 1, 1957, Serial No. 693,989

8 Claims. (Cl. 324—70)

This invention relates generally to tachometers, and more particularly to apparatus for indicating the number of pulses per unit of time of a series of pulses.

The tachometer of the present invention is particularly useful for indicating the number of revolutions per minute of internal combustion engines of the type used in automobiles, boats, planes, lawn mowers, and the like.

In order to operate many types of internal combustion engines properly, it is important for the operators to know the number of revolutions per minute of the engines at all times. To do this, it has been proposed to count the pulses from one of the spark plugs of the engine as a function of the speed of the engine.

Counters employing electronic multivibrator circuits have been used for this purpose. In an electronic multivibrator circuit employing a pair of current conducting devices, however, current flows through one current conducting device while current is cut off in the other current conducting device. It is, therefore, necessary to have an on-off switch for a tachometer employing a multivibrator circuit so that the current through one of its pair of current conducting devices can be cut off when the engine is not running.

It has also been found that tachometers employing multivibrator circuits that use transistors as their current conducting devices are affected by changes in temperature. Thus, a monostable multivibrator, for example, at a relatively normal room temperature may become a free running multivibrator at the elevated temperature in the proximity of an internal combustion engine.

Most prior art tachometers, mechanical or electronic, require some physical connections to the engine whose speed is to be indicated. These connections may include complicated universal joints in the case of mechanical tachometers, or wires in the case of electronic tachometers.

Accordingly, it is an object of the present invention to provide an improved tachometer that does not require an on-off switch.

Another object of the present invention is to provide an improved tachometer having a circuit that is stable over a wide range of temperatures, and requiring a minimum of calibration.

A further object of the present invention is to provide an improved portable tachometer that may be carried by hand, and that will indicate the speed of an engine merely by holding it in close proximity thereto.

Still a further object of the present invention is to provide an improved tachometer circuit that is simple in construction and operation, and is highly efficient in use.

These objects and related advantages of the present invention are attained in a tachometer employing a circuit comprising a pair of transistors of opposite conductivity type. Each of the emitter-collector paths of the pair of transistors is connected in a separate parallel circuit across a source of voltage so that current will flow through each transistor in the same direction. The base of each transistor is cross connected to the collector of the other transistor to provide positive feed back therebetween. One of the cross connections includes indicating means and a capacitor connected in series therewith.

The indicating means of the tachometer circuit includes a diode whose leakage resistance decreases with temperature. This diode is connected in a manner to shunt more current around a speed indicating meter at elevated temperatures. Thus, the meter maintains its calibration over a wide range of temperature variation of the pair of transistors. The pulses to be counted by the meter are applied to the other cross connection. These pulses may be pulses derived from the current lead to a spark plug of the engine whose speed the tachometer is to indicate.

The novel features of the present invention, as well as the invention itself, both as to its organization and method of operation, will be understood in detail from the following description when considered in ocnnection with the accompanying drawing which is a schematic diagram of the tachometer in accordance with the present invention.

Referring now to the drawing, there is shown a tachometer 10 employing a pair of transistors 12 and 14 of opposite conductivity type. The transistor 12 may be of the PNP type, and the transistor 14 may be of the NPN type. A source 16 of voltage is connected across the transistor 12, through a collector resistor 18, in a manner whereby current will flow from the emitter to the collector of the transistor 12. The transistor 14 is connected across the voltage source 16, through a collector resistor 20, in a manner whereby current will flow from the collector to the emitter of the transistor 14.

Means are provided to connect the transistors 12 and 14 regeneratively. To this end, the base of the transistor 14 is connected to the collector of the transistor 12. The base of the transistor 12 is connected to the collector of the transistor 14 through a meter circuit 22 and a capacitor 24 connected in series therewith.

The meter circuit 22 comprises a diode 26 and a variable resistor 28 connected across a microampere meter 30. The anode of the diode 26 is connected to the base of the transistor 12, and the cathode of the diode 26 is connected to the capacitor 24. The diode 26 functions to convert alternating current to pulsed direct current so that the latter may be integrated by the meter 30. Thus, the diode 26 and the meter 30 comprise direct current indicating means.

A bias resistor 32 is connected between the emitter and the base of the transistor 12. An input terminal 33, for pulses to be counted by the tachometer 10, is connected to the base of the transistor 14 through a relatively large isolation resistor 34. The emitter of the transistor 14 is connected to a common connection, such as ground, through a relatively large isolation resistor 36, for the purpose hereinafter appearing.

The operation of the tachometer 10, illustrated in the drawing, will now be described. In the tachometer circuit, each of the resistors 18 and 32 between the emitter and base of the transistors 14 and 12, respectively, has a value such that the transistors 12 and 14 exhibit substantially no amplification for extremely small input current. Thus, in the absence of a pulse applied to the input terminal 33, substantially no current will flow through the transistors 12 and 14.

Let it be assumed that it is desired to indicate the speed of an internal combustion engine (not shown). Current pulses from a single spark plug of the engine may be applied to the input terminal 33. This may be accomplished by wrapping a few turns of wire, or a clip, around a lead to one of the spark plugs, and connecting the wire to the input terminal 33.

As a result of this connection, let it be assumed that a series of positive pulses, such as the pulse "P" is applied to the input terminal 33. The positive pulse P is thus applied to the base of the transistor 14. The transistor 14, being of the NPN type, will be triggered on. The voltage at the collector of the transistor 14 will now be negative-going, and will be applied to the base of the transistor 12 through the capacitor 24 and the meter circuit 22. The transistor 12, being of PNP type, will be triggered on, and will cause current to flow through the resistor 18. The increased voltage across the resistor 18, as a result of current therethrough, will tend to maintain the transistor 14 conducting.

The values of the components of the tachometer circuit are so chosen that the loop gain resulting from the cross connections between the transistors 12 and 14 is greater than unity. Under these conditions, regeneration occurs and causes the almost instantaneous saturation of both of the transistors 12 and 14. The transition from the non-conducting state to the state of saturation of the transistor 12 and 14 is so rapid that no appreciable charge accumulates on the capacitor 24. After saturation, the relatively large current from the base of the transistor 12 to the collector of the transistor 14, through the diode 26 and capacitor 24, charges the capacitor 24 to approximately the voltage of the voltage source 16.

As the capacitor 24 charges, however, the current through it decays exponentially until its magnitude is insufficient to sustain the transistor 12 in the saturated state. Under these conditions, the voltage at the base of the transistor 14 decreases until both the transistors 12 and 14 are again cut off. As the transistor 14 comes out of the state of saturation, the loop gain is re-established, regenerating almost instantaneously to the non-conducting state.

The accumulated charge on the capacitor 24 now leaks off in a direction such as to reverse bias the diode 26. The current from the capacitor 24, therefore, divides between the calibrating resistor 28 and the meter 30. It is this current that the meter 30 indicates. The meter 30 will average the rectified pulses applied to it, and the variable resistor 28 may be varied so that the meter 30 may be calibrated in occurrences per unit of time, such as, for example, revolutions per minute.

Familiar temperature effects of transistors would ordinarily cause increased meter current at elevated temperatures. By a proper choice of the diode 26, however, it is possible to provide a leakage resistance that decreases with temperature in a desired manner. Thus, the aforementioned increased meter current may be shunted around the meter 30, thereby compensating for the aforementioned temperature effects of the transistors.

The components of the tachometer 10 are relatively small and few. In practice, it has been found satisfactory to mount all of the components on the back of the meter 30. This construction makes the tachometer 10 hand portable. As such, it may be held near an internal combustion engine to indicate the revolutions per minute thereof, even in the absence of any physical or electrical connection thereto. A knowledge of the number of cylinders of the engine is necessary in order to read the calibrated scale on the meter 30. It is obvious, for example, that the pulses from an eight cylinder engine will be twice the number as from a four cylinder engine for an equal number of revolutions.

In some instances, where the tachometer 10 is mounted on the chassis of a vehicle, or the like, to indicate the revolutions per minute of an internal combustion engine, erratic triggering may occur if the isolation resistor 36 is eliminated.

A tachometer of this invention has been successfully operated for extended periods under the sun-baked cowl of a motor boat to indicate the revolutions per minute of the boat engine. This tachometer employed components having the following values:

| Component | Unit | Value |
|---|---|---|
| Resistor 34 | ohms | 10K |
| Resistor 36 | do | 10K |
| Resistor 18 | do | 300 |
| Resistor 20 | do | 300 |
| Resistor 32 | do | 470 |
| Resistor 28 | do | 3.6K |
| Meter 30 | microamperes | 0–50 |
| Transistor 12 | | 2N104 |
| Transistor 14 | | 2N35 |
| Capacitor 24 | microfarads | ½ |
| Diode 26 | | 1N93 |
| Voltage source 16 | volts | 1.35 |

It will be understood that these values are illustrative, and are not to be interpreted in a limiting sense.

Thus, there has been shown and described a tachometer, in accordance with the objects of the present invention, wherein a pair of transistors of opposite conductivity type have been incorporated in a manner whereby both transistors conduct substantially simultaneously, and both are cut off substantially simultaneously. Since the amplification of the transistors in the tachometer circuit of the present invention is substantially zero for extremely small input currents, no on-off switch for the tachometer 10 is necessary. In the absence of any pulse to the input terminal 33, as when an engine is not running, only leakage currents in the order of about 20 microamperes flow through the transistors, thereby eliminating the necessity for an on-off switch.

What is claimed is:

1. Apparatus comprising a pair of transistors of opposite conductivity types each having an emitter, a collector, and a base, means including a first collector resistor to apply a source of voltage between said collector and said emitter of one of said pair of transistors, means including a second collector resistor for applying said source of voltage between said collector and said emitter of the other of said pair of transistors, means connecting said collector of said one transistor to said base of said other transistor, means including a capacitor and indicating means to connect said base of said one transistor to said collector of said other transistor, means to apply biasing means between said emitter and said base of said one transistor to just cut off conduction therethrough, and means to apply input pulses across said first collector resistance to cause said transistors to conduct only during said pulses of one polarity.

2. Apparatus comprising a pair of transistors of opposite conductivity types each having an emitter, a collector, and a base, means including a first collector resistor to apply a source of voltage between said collector and said emitter one of said pair of transistors, means including a second collector resistor for applying said source of voltage between said collector and said emitter of the other of said pair of transistors, means connecting said collector of said one transistor to said base of said other transistor, means including a capacitor and indicating means to connect said base of said one transistor to said collector of said other transistor, means to apply biasing means between said emitter and said base of said one transistor to just cut off conduction therethrough, means to apply input pulses across said first collector resistance whereby to cause said transistors to conduct only during said pulses of one polarity, and means to connect impedance means across said indicating means for calibrating said indicating means.

3. Apparatus comprising a first transistor and a second transistor each having complementary and symmetrical conduction characteristics and each having an emitter, a collector, and a base, means to connect said first and said second transistors in parallel circuits, means to apply a source of voltage across the emitter-collector paths of said first and said second transistors, cross connections from the bases of said first and second transistors to the collectors of said second and first transistors respectively to provide positive feedback therebetween, one of said cross connections comprising indicating means and a capacitor connected in series therewith, means to apply a source of pulses to the other of said cross connections, and means to apply biasing means between said emitter and said base of each of said transistors to cause said transistors to conduct only during said pulses of one polarity.

4. Apparatus comprising a first transistor and a second transistor each having complementary and symmetrical conduction characteristics and each having an emitter, a collector, and a base, means to connect said first and said second transistors in parallel circuits, means to apply a source of voltage across the emitter-collector paths of said first and said second transistors, cross connections from the bases of said first and second transistors to the collectors of said second and first transistors respectively to provide positive feedback therebetween, one of said cross connections comprising direct current indicating means and a capacitor connected in series therewith, means to apply a source of pulses to the other of said cross connections, means to apply biasing means between said emitter and said base of each of said transistors to cause said transistors to conduct only during said pulses of one polarity and impedance means connected across said indicating means to calibrate said indicating means to indicate a predetermined number of pulses per unit of time.

5. Apparatus for indicating the number of pulses per unit of time comprising a pair of transistors having complementary and symmetrical current characteristics and each having an emitter, a collector, and a base, means including a collector resistor for each of said transistors to apply a source of voltage between said collector and said emitter of each of said transistors, means to apply said pulses to said collector of one of said transistors and to said base of the other of said transistors, a capacitor, indicating means, means to connect said capacitor and said indicating means in series with each other and between said base of said one transistor and said collector of said other transistor, means to apply biasing means between said emitter and said base of said one transistor to cause said transistors to conduct only during said pulses of one polarity and said indicating means comprising a meter and a diode in shunt therewith.

6. Apparatus for indicating the number of pulses per unit of time comprising a pair of transistors having complementary and symmetrical current characteristics and each having an emitter, a collector, and a base, means including a collector resistor for each of said transistors to apply a source of voltage between said collector and said emitter of each of said transistors, means connecting said collector of one of said transistors to said base of the other of said transistors, means to apply said pulses to said base of said other of said transistors, a capacitor, indicating means, means to connect said capacitor and said indicating means in series with each other and between said base of said one transistor and said collector of said other transistor, an impedance connected between said emitter and said base of said one transistor, means to apply biasing means between said emitter and said base of said one transistor to cause said transistors to conduct only during said pulses of one polarity, said indicating means comprising a meter and a diode connected thereacross, and said diode having an impedance that decreases with a rise in temperature.

7. Apparatus comprising a first transistor of one conductivity type, a second transistor of another conductivity type, each of said transistors having an emitter, a collector, and a base, first and second resistors for said first and said second transistors respectively, means to connect said emitter of said first transistor to said collector of said second transistor through said second resistor, means to connect said emitter of said second transistor to said collector of said first transistor through said first resistor, means to connect said collector of said first transistor to said base of said second transistor, means including said first and second resistors to apply a voltage across the emitter-collector paths of said first and second transistors, a capacitor, indicating means, means to connect said capacitor and said indicating means between said collector of said second transistor and the base of said first transistor, means to apply pulses to said base of said second transistor, and means to apply biasing means between said emitter and said base of said first transistor to cause said transistors to conduct only during said pulses of one polarity.

8. Apparatus comprising a first transistor of one conductivity type, a second transistor of another conductivity type, each of said transistors having an emitter, a collector, and a base, first and second collector resistors for said first and said second transistors respectively, means to connect said emitter of said first transistor to said collector of said second transistor through said second collector resistor, means to connect said emitter of said second transistor to said collector of said first transistor through said first collector resistor, means to connect said collector of said first transistor to said base of said second transistor, means including said first and second collector resistors to apply a voltage across the emitter-collector paths of said first and second transistors, a capacitor, direct current indicating means, means to connect said capacitor and said direct current indicating means between said collector of said second transistor and said base of said first transistor, biasing means connected between said emitter and said base of said first transistor to cause said first transistor to conduct only when pulses of one polarity are applied to said base of said first transistor, means to apply pulses to said base of said second transistor, said direct current indicating means comprising a meter and a diode connected thereacross, and said diode having an impedance that varies with temperature in an opposite sense to the impedance variation of said first and second transistors with temperature.

References Cited in the file of this patent

UNITED STATES PATENTS 2,831,113    Weller  ---------------- Apr. 15, 1958